United States Patent [19]
Mosley

[11] 3,753,300
[45] Aug. 21, 1973

[54] ORRERY PROJECTION AND DRIVE

[76] Inventor: Kenneth C. Mosley, 6056 Del Cano S.E., Grand Rapids, Mich. 49506

[22] Filed: July 17, 1972

[21] Appl. No.: 272,393

[52] U.S. Cl. ........................... 35/42.5, 35/45, 74/69, 353/11
[51] Int. Cl. .......................................... G09b 27/02
[58] Field of Search ....................... 35/42.5, 43, 45; 353/11, 12, 62; 74/69

[56] References Cited
UNITED STATES PATENTS

| | | | |
|---|---|---|---|
| 1,616,736 | 2/1927 | Bauersfield | 35/42.5 |
| 2,483,216 | 9/1949 | Marshall | 35/42.5 |
| 2,947,184 | 8/1960 | Olson | 74/69 |
| 3,074,183 | 1/1963 | Frank | 35/45 |
| 3,286,536 | 11/1966 | Hallmann | 74/69 X |
| 3,363,507 | 1/1968 | Brandon | 35/42.5 |
| 3,571,954 | 3/1971 | Frank | 35/42.5 |
| 3,589,035 | 6/1971 | Vickery | 35/42.5 |

*Primary Examiner*—Wm. H. Grieb
*Attorney*—Peter P. Price, Daniel Van Dyke et al.

[57] ABSTRACT

Each image projector is suspended by and within a ring about a pair of axes perpendicular to each other and to the image projection axis. The image projector is driven simultaneously about both axes of the ring by a drive mechanism interconnected to the projector whereby an image is projected on a screen defining an orbital path. The magnitude and type of orbital path is selected by the spacing of the axes from each other and the drive mechanism. Where the orbit is elliptical, the drive mechanism includes an input shaft and wheel and an output shaft and wheel. An axially extending pin from the input wheel is confined within a radial slot in the output wheel whereby rotation of the input shaft at a constant velocity drives the output shaft and connected projector at a variable cyclical velocity corresponding generally to Kepler's Second Law.

In another aspect of the invention, the plane of the drive mechanisms are rotatable in cooperation with each other to provide binary star projection and variable aspect orrery projection.

34 Claims, 24 Drawing Figures

Patented Aug. 21, 1973

Patented Aug. 21, 1973

Patented Aug. 21, 1973 3,753,300

ORRERY PROJECTION AND DRIVE

BACKGROUND OF THE INVENTION

1. Field of Invention

This invention relates to an apparatus for projecting an image simulating orbital movement and, more particularly to an improved projection orrery capable of projecting a plurality of coordinated orbiting celestial images on a screen at variable aspects which move according to Kepler's Second Law.

2. Description of the Prior Art

A planetarium is a device which simulates the movement of selected planets and stars by image projection on a screen. A particular type of planetarium is an orrery which projects images of the planets including the Earth and Sun on a screen from a point of reference out in the solar system.

The movement of planets in the solar system has intrigued astronomers for centuries, and indeed may well be the oldest science of man. Despite the age of astronomy, the first modern planetarium was not installed until the early 1920's in Germany. The principal objective of any planetarium system is to simulate as closely as possible the true orbital movement and relationships of the various stars or planets. Of the prior art known to applicant, that which in part at least provides an adequate simulation of certain aspects of orbital relationships suffers a single overall drawback in that in order to achieve a realistic duplication or simulation of the Earth's solar system, extremely complex and expensive mechanisms are required. While such costs may not prohibit the purchase of such as apparatus for a facility funded by a major metropolitan area, the limited budgets of a far larger number of communities or educational facilities do not permit such purchase. On the other hand, known prior art which is less expensive is undesirable in that it fails to provide enough features and flexibility necessary to provide an accurate educational and stimulating representation of planetary or star movement.

The six inner planets--Mercury, Venus, Earth, Mars, Jupiter and Saturn--move elliptically around the sun defining ellipses of varying magnitude, eccentricity, and speed in accordance with Kepler's Second Law. Applicant is unaware of an orrery projection mechanism which will accomplish the duplication of these movements in a relatively simple and inexpensive device capable of accurate projection in the smallest or largest planetariums known.

Orrery projection is preferred in many respects over a conventional planetarium since it provides the viewer with an image of the Earth's solar system and Sun with the Earth's relative movement included opposed to a view from the Earth itself. This is more stimulating to the observer since it gives the viewer quite a different perspective on how the Earth for example fits into its solar system. A more unique experience is provided by an apparatus which is capable of simultaneously varying the aspect of planetary movement. For example, if the orrery depicts planetary movement from a position directly above the Sun on a line perpendicular to the plane of the Earth's rotation, it is extremely instructive to witness the planetary movement in motion through rotation of 90° to a reference point for example on the plane of the Earth's rotation. Applicant is unaware of any prior art orrery projectors capable of performing such a projection. The only known device capable of simulating the projection of planets or stars through a variable aspect utilizes a plurality of individual type of projectors capable of selected orbital movement independently of each other and linked together by a computer and related program to direct the independent projectors through variable aspects. Such a combination of projectors including the programing and computer network is extremely prohibitive from the standpoint of cost alone.

Yet another desirable feature in an image projecting mechanism in addition to the foregoing, is a projector capable of projecting the image of a binary star, for example eclipsing binaries. Applicant is unaware of such a device in the prior art.

In view of the foregoing, there is an overwhelming need in this art for an improved image projecting device capable of performing a variety of orbital projecting functions and yet has a relatively simple structure so that the cost of such a device is not prohibitive.

SUMMARY OF THE INVENTION

The projection of an image onto a screen is generally achieved by a projector means utilizing a light source, image plane and lens. In planetariums or the like, the projector means is generally mounted within a framework of controlled movement relative to other projector means to simulate orbital movement on the screen of celestial bodies relative to other celestial bodies.

In accordance with the invention, the image projector is suspended by and within a ring means for rotation about first and second axes perpendicular to each other. Simultaneous rotation about the two axes causes elliptical movement of the image on a screen. In a narrower aspect of the invention, if the two axes are non-intersecting, the elliptical movement has an eccentricity greater than zero.

In other aspects of the invention, the drive means for moving the projector comprises an input shaft having means affixed thereto for joint rotation and an output shaft having means affixed thereto likewise for joint rotation. Pin means extending axially from the input shaft means is captured within a radial slot means in the output shaft means so that constant speed rotation of the input shaft causes uniform variable speed rotation of the output shaft which when connected to the projector means of the invention causes elliptical movement of the image on the screen in close approximation with Kepler's Second Law.

In yet other aspects of the invention, two or more projectors are operatively associated together by drive means rotatable in the same plane, which plane is rotatable relative to the projector means to provide variable aspect projection and/or image projection simulating binary star movement.

Preferably, the projector means of the invention is suspended from a support frame by a gimbal ring while the drive means actuating the movement of the projector means is an eccentrically positioned tube extending from a rotating wheel mounted on the output shaft, which tube receives a pin extending axially from the projector, the latter having a ball on the end for following the rotary movement of the wheel and tube. The overall structural relationship provided by the invention is extremely simplified when compared to the prior art making it extremely attractive from both an operational and economical standpoint. Of equal importance however, the flexibility provided through adjustment of the mechanism of the invention permits orbital simulation never heretofore available in a single projection mechanism.

DESCRIPTION OF THE PREFERRED EMBODIMENTS

The apparatus of the invention is directed broadly to a mechanism for projecting an image on a screen and moving it to simulate orbital movement. Significantly, it is directed to projecting two or more images to illustrate their relative orbital movements. While most planetariums and the like are primarily concerned with celestial orbital movements, the apparatus of the invention could also be used to depict man-made celestial orbiting such as for example, the movement of a space ship around a celestial body or around a space station.

The following description is directed specifically to an apparatus defined as an orrery projector. This is the type of planetarium projector which specifically relates to the image projection of planets opposed to stars although certain aspects of the invention are directed to a projector which simulates binary star movements.

Nine major planets defined as heavenly bodies shining by reflected light revolve around the Earth's Sun, including the Earth. Thousands of minor planets or asteroids are also orbiting in the Earth's planetary system, especially between the orbits of Mars and Jupiter. The preferred orrery described below simulates a solar system comprising the movements of six inner planets about the Sun including in their order of distance from the Sun: (1) the inferior planets Mercury and Venus; (2) Earth and its Moon; and (3) the superior planets Mars, Jupiter and Saturn.

Figure 18:
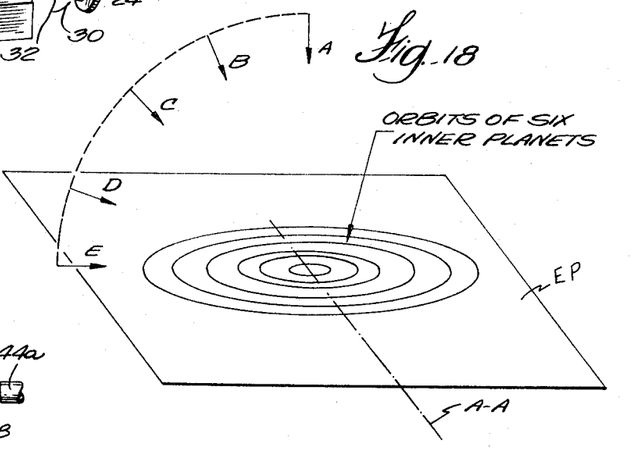
FIG. 18 is a schematic view illustrating the reference viewing of an orrery projector with variable aspect.

As defined herein, reference to the phrase "standard orrery projection" means that the planetary system is viewed from a position in space directly above or below the Earth's ecliptic plane on a line through the Sun perpendicular to the Earth's ecliptic plane. This is illustrated in FIG. 18 by the arrow A. A variable aspect orrery is one which would provide a means of observing the solar system from any point in space along a line equal distance from the Sun and running from a point above the Sun, perpendicular to the ecliptic down to a point which lies in the ecliptic plane of the Earth. This is illustrated in FIG. 18 by arrows A-E.

Figure 1:
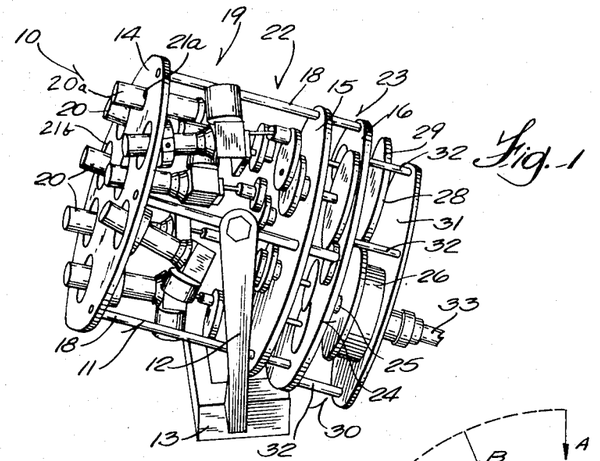
FIG. 1 is a perspective view of the projection device and control panel provided by the invention.

Referring now to the drawings in detail, FIG. 1 illustrates a standard orrery projector 10 comprising a frame 11 rotatably supported by a pair of generally upstanding support columns 12 (only one of which is shown) affixed to a base 13. Frame 11 has an overall drum-shaped configuration formed by three longitudinally spaced mounting plates 14, 15 and 16. The plates are held together in a fixed relationship by a plurality of circumferentially spaced axially extending rods 18 in a conventional manner. Plates 14 and 15 define a housing 19 for holding a plurality of image projectors 20, each of which projects an image of one of the six planets, Sun or Moon which will be described in more detail hereinafter.

Each projector extends through a face plate 14 which includes a plurality of appropriately positioned openings 21a, 21b etc. . A plurality of unique drive mechanisms 22 are provided for actuating the projectors, the drives varying slightly from each other as described hereinafter. The type of drive required depends on the particular type of movement required to simulate the required path of the planet being projected as it revolves around the Sun. Drive train 22 is mounted to plate 15 intermediate plates 14 and 15.

Plates 15 and 16 define a gear reduction housing 23 in which a gear train 24 is mounted. Gear train 24 reduces the speed of the primary drive shaft 25 extending from motor 26. Shaft 25 through pulley belt 28 rotates a pulley 29 operatively connected to gear train 24. The gear train 24 also includes conventional gearing for further reduction and independent operation of the individual drives in drive train 22. Motor 26, belt 28 and pulley 29 are attached to the underside of plate 16 and positioned in a motor housing 30 formed by plate 16 and an auxiliary mounting plate 31. Mounting plate 31 is attached to plate 16 by a plurality of circumferentially spaced axially extending rods 32. Mounting plate 31 serves as a place to anchor the electrical connectors for a power cord 33 which leads to a remotely positioned control panel not shown. A cosmetic protective cover (not shown) fits over frame 11 to fully enclose the entire apparatus.

The control panel (not shown) preferably includes a housing in which the requisite electrical circuitry is positioned. A plurality of manipulative adjustment control switches extend from the panel for selectively controlling the various operational features of the orrery projector. A power source cord when plugged into an appropriate power outlet provides the requisite energization to run the projector itself and illuminate the lamps of each image projector.

Figure 2:
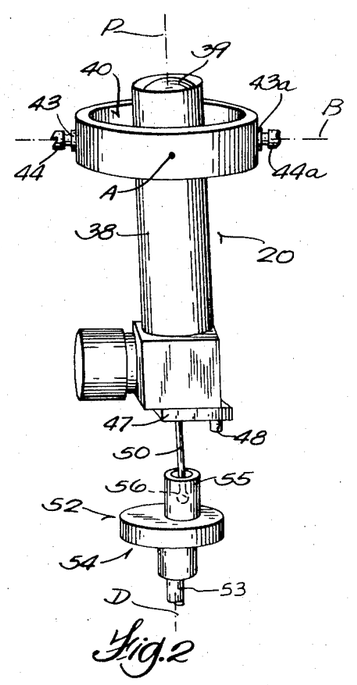
FIG. 2 is a fragmentary perspective view of one of the projectors shown in FIG. 1.

Referring now to FIG. 2, projector 20 includes a tubular shaped body 38 having a lens 39 at its upper end, the tubular body housing a conventional light source and image (not shown) intermediate the lens and light source. Generally, the image utilized in the projection will be transparent. The image is preferably replaceable to permit selecting various images for projecting onto a screen depending on the particular objectives.

Planetary rotation about the Sun when viewed above the Sun perpendicular to the Earth's ecliptic plane is for all practical purposes circular with respect to Venus, Earth, Jupiter and Saturn. While the exact movement of these planets defines an elliptical path having a degree of eccentricity, the eccentricity is so slight as to be indiscernible. Mercury however moves in an elliptical path having a definite eccentricity. Mars lies somewhat intermediate Mercury and the remaining planets in that its eccentricity is small although a truly accurate simulation would show a visual eccentric ellipse. The unique way in which each projector is suspended within frame 11 however, permits movement of the projector so that the corresponding image on the screen represents that of an ellipse whether it has a zero or positive eccentricity. The structures vary however slightly so that the initial suspension described relates to a projector utilized to project an image orbiting in a circular path.

Figure 3:
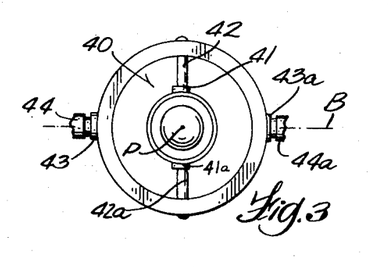
FIG. 3 is a fragmentary plan view of the projector shown in FIG. 2.

Referring now in detail to FIGS. 2 and 3, a projector 20 is shown to be suspended concentrically within an annular ring 40 referred to hereinafter as a gimbal ring. A pair of bearings 41 and 41a (FIG. 3) are anchored to the side walls of tube 38 on diametrically opposite sides for receipt respectively of a pair of pins 42 and 42a. Pins 42 and 42a are aligned axially so that projector 20 is suspended within ring 40 by its own weight in a vertical orientation. The projector however is free to rotate about an axis A defined by pins 42, 42a perpendicular to the axis of image projection designated as axis P in the drawings.

A second set of bearings 43 and 43a are mounted on the outer surface of gimbal ring 40 at diametrically opposite positions rotated 90° from the positions of bearings 41, 41a, and pins 42, 42a. A second set of pins 44, 44a are seated in bearings 43, 43a respectively and anchored at their opposite ends to a pair of supports 45, 45a illustrated in FIG. 15. Supports 44, 44a are attached to the underside of plate 14. Pins 44, 44a limit the movement of ring 40 to rotation about the axis of pins 44, 44a defined in FIG. 3 as axis B which is perpendicular to axis A.

Figure 4:
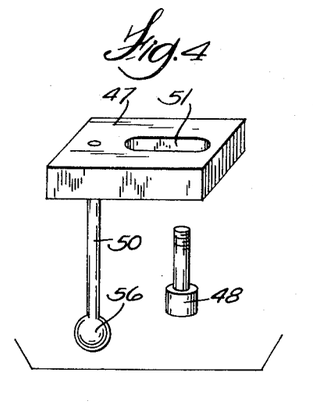
FIG. 4 is a perspective view of an adjustment mechanism on the projector shown in FIG. 2 for adjusting the orbital concentricity.

Referring now to FIGS. 2 and 4, an adjustment block 47 is anchored to the bottom end of projector 20 by a screw 48. A pin 50 is anchored in block 47 and extends normal to its lower face so that when block 47 is attached to the lower end of the projector, pin 50 extends coaxially with or parallel to the projection axis P. Pin 50 includes a ball 56 at its lower end which may be moved as will be described to determine the position of projector 20 and thereby the direction in which projector 20 projects an image on the screen. Ball 56 thus in effect represents an analog of the image projection. Screw 48 extends through an elongated slot 51 in the adjustment block so that block 47 can be positioned at selected positions relative to projection axis P, to initially set the aim of projector 20 as will be described hereinafter. Once the aim is set, screw 48 is tightened so that block 47 and projector 20 become a rigid assembly.

Figure 11:
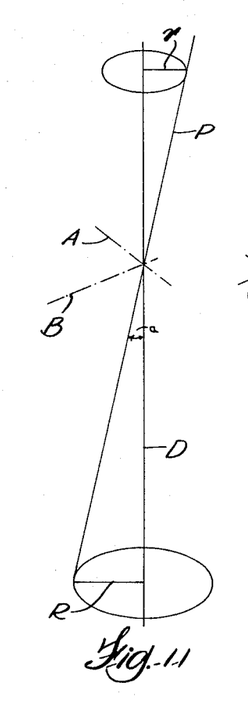
FIG. 11 is a schematic illustration of the image path driven by the projector mechanism shown in FIG. 2.

One of the drive mechanisms 52 utilized to actuate the movement of the projector 20 shown in FIG. 2 is comprised of a drive shaft 53 on which is mounted a drive wheel 54 which rotates jointly with shaft 53. A tube 55 is seated on the upper face of wheel 54 and is positioned so that its axis is parallel to but spaced from the drive axis D of drive shaft 53. In other words, tube 55 is positioned eccentrically on wheel 54. As illustrated in FIG. 2, the lower end of pin 50 including ball 56 is captured within tube 55 so that as drive shaft 53 and drive wheel 54 are rotated, projector 20 is likewise rotated in a circle about axis D in the plane of wheel 54. The bore of tube 55 is preferably close fitting to ball 56 so that if the drive axis D intersects the point at which both axes A and B of ring 40 intersect, the rotation of wheel 54 will drive the bottom of projector 20 about the projector axis to describe a cone. Referring to FIGS. 2 and 11, if the center of tube 56 is positioned on wheel 54 a distance R from the axis D of rotation of the wheel, it may be seen that as wheel 54 rotates, ball 55 describes a circle of radius R. The magnitude of radius R and the distance to the intersecting axes A and B of the gimbal ring 40 will determine the angle "$a$" (FIG. 11) of the cone described by the axis of projection P. Since the distance between ball 56 and each axis A and B of gimbal ring 40 is the same, the angle between the projection axis P and axis of rotation D will be constant for any position of wheel 54. Hence, the image projected on a screen by projector 20 will trace the path of a circle having a constant radius $r$ about axis D.

The foregoing projector arrangement and drive mechanism represents the mechanisms utilized to drive the projectors corresponding to the orbital revolutions of Venus, Earth, Jupiter and Saturn. A circular orbit for these planets is an adequate representation since the revolutions of these planes about the Sun when viewed on an axis passing through the Sun normal to the Earth's ecliptic plane is in a close proximity to a circle.

Figure 5:
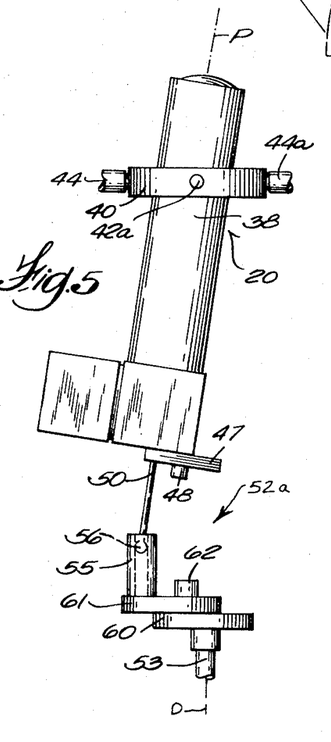
FIG. 5 is a fragmentary side elevation view of a projector driven by an alternative drive mechanism to the one shown in FIG. 2.

Referring to FIG. 5, a modified drive mechanism 52a is illustrated which provides a simple method of adjusting the radius of orbit. Like reference numerals are utilized for parts in drive mechanism 52a which correspond identically to those described with reference to drive mechanism 52 shown in FIG. 2.

Figure 6:
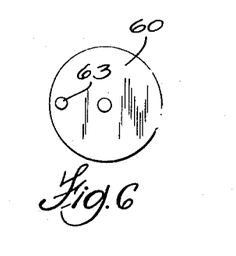
FIGS. 6-9 are plan views of the various arrangements of the drive mechanism shown in FIG. 5.
Figure 7:
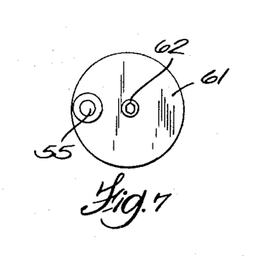

In the modified drive mechanism 52a, a pair of adjustment wheels 60 and 61 are utilized in place of wheel 54 shown in FIG. 2. Wheel 60 is concentrically mounted to shaft 53 for rotation jointly therewith while wheel 61 is adjustably connected to wheel 60 by a screw 62 threadable into a tapped hole 63 positioned in wheel 60. FIG. 6 illustrates wheel 60 and the positioning of tapped hole 63 along a radius toward the edge of wheel 60. FIG. 7 illustrates wheel 61 and shows the threaded fastener 62 to be mounted through the center of wheel 61. Preferably, a clearance hole is provided in the center of wheel 61 to permit passage of screw 62 for uniting wheel 61 on top of wheel 60. Extending upwardly from wheel 61 is tube 55 (FIG. 5) for receipt of ball 56 extending from the projector.

Ball 56 may be thought of as a model planet to be driven around in a circular orbit. The orbit is to be defined by the bore of tube 55 as it rotates around the drive axis D. The distance from the center of shaft 53 to the center of tube 55 then represents the distance from the Sun to the planet. The center to center distance of the two holes in wheel 60 (i.e., from its center to tapped hole 63) equals the center to center distance of wheel 60 to wheel 61.

Figures 8, 9:
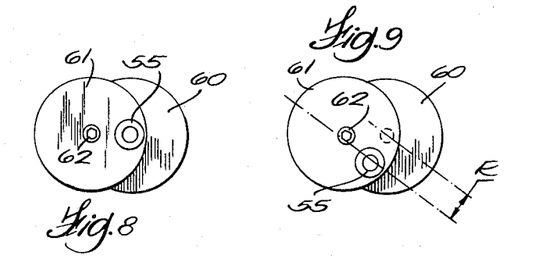

Thus, it is possible to rotate wheel 61 around the screw 62 until tube 55 is concentric with the drive axis D of shaft 53 as illustrated in FIG. 8. Under these circumstances, the planet has been set in the center of the Sun and the images of the Sun and the planet should be concentric. Chances are, however, that they will not be concentric when the projectors are illuminated, and another setting will be required to accomplish this. Referring back to FIG. 5, with tube 55 set concentric to the axis of shaft 53 (i.e., orbital magnitude zero), screw 48 holding adjustment block 47 may be loosened and the projector moved around until the two images are concentric on the screen. This is facilitated by slot 51 in block 47. Once the images are concentric, screw 48 holding block 47 is retightened making a rigid assembly once more between block 47 and projector 20. Now that the planet's image coincides with the Sun's image, the planet's orbit is concentric with the Sun. Screw 62 is now loosened and wheel 61 rotated until the desired radius of orbit R (FIG. 9) is set. Screw 62 is then retightened and the particular projector is set relative to the Sun's projector.

Where a planet revolves concentrically around the Sun, following essentially a circular path, its rotational velocity is essentially constant. Hence, in those planets utilizing a drive mechanism and gimbal ring arrangement similar to that illustrated and described in FIG. 2 or modified in accordance with the adjustment mechanisms of drive mechanism 52a illustrated in FIGS. 5–9, conventional gear reduction elicits a rotational speed of shaft 53 which coincides with the simulated speed of the particular orbit being projected and a constant speed input elicits the desired constant speed output of the image moving on the screen.

The revolutions of Mercury and Mars, as noted earlier trace an elliptical path having a positive eccentricity when viewed on an axis passing through the Sun normal to the Earth's ecliptic plane. While these planets do not reveal a great degree of eccentricity when viewed from this position, it is desirable to slightly exaggerate their elliptical representation for educational purposes and clarity. The following describes a means for driving a projector 20 such that the image projected on a screen traces an elliptical path.

Figure 10:
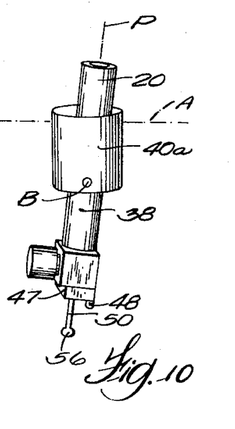
FIG. 10 is a reduced view of the projector shown in FIG. 2 utilizing an alternative suspension ring.
Figure 12:
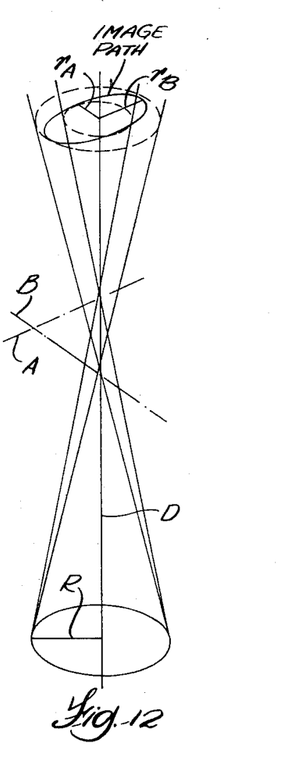
FIG. 12 is a schematic illustration of the image path driven by the projector mechanism shown in FIG. 10.

Referring to FIG. 10, an apparatus similar to that illustrated in FIG. 2 is shown with a modified gimbal ring 40a substituted for ring 40. The distinction between the two gimbal rings is that the axes of rotation A and B defined by pins 42, 42a and 44, 44a are spaced axially along the projection axis P. Assuming the same structure as shown and described in FIG. 2 except for the substitution of gimbal ring 40 with gimbal ring 40a shown in FIG. 10, the distance between ball 46 and axis A of ring 40a will be greater than the distance between ball 56 and axis B. Thus, even though ball 56 is driven in a circle by wheel 54 and tube 55, a projected ellipse will result because radius R and the distance from ball 56 to axis B produces a greater angle of projection than radius R and the distance to axis A. FIG. 12 shows the tracing of an image resulting in a minor and major radius $r_A$ and $r_B$ caused by the magnitude of radius R acting over a greater distance between ball 56 and axis A of gimbal ring 40a and a smaller distance between ball 56 and axis B of ring 40a. The simultaneous rotation about both of the separated axes A and B describes an image projected on the screen following the path of an ellipse, the eccentricity and magnitude of which is a function of the parameters defined herein.

Referring briefly back to FIG. 4, the overall aim of projector 20 is determined by the position of pin 50 relative to the projection axis P. This is determined by the adjustment of block 47 in accordance with the location of screw 58 in slot 51. This type of fine adjustment becomes important when a plurality of projectors are cooperatively aligned with each other to simulate planetary movement about the Sun.

In the case of planetary movement such as Mercury or Mars wherein an elliptical projection is desired, it will be appreciated that elliptical planetary movement about the Sun moves in accordance with Kepler's Second Law whereby the rotational velocity varies depending on the distance between the center of mass of the Sun and particular planet in question. Kepler's Second Law states that a line connecting the center of mass of a planet with the Sun around which it orbits sweeps out equal areas in equal times. Thus, the rate of change of velocity is uniform with the angular velocity being a maximum when the planet is closest to the Sun and a minimum when it is farthest from the Sun. During one half of a cycle it is accelerating while during the other half it is deaccelerating. Of course, if the path of orbit is circular, the rate of change is zero and the velocity is a constant. In this latter case, the orbital simulation of these planets is provided by the utilization of a drive mechanism and gimbal ring arrangement similar to that illustrated and described in FIG. 2 and modified in accordance with the adjustment mechanisms of drive mechanism 52a illustrated in FIGS. 5–9. By proper selection of gear reduction in gear train 24, a constant rotational speed of shaft 53 selected to coincide with the simulated speed of the particular orbit being projected elicits the desired constant speed output of the image moving on the screen around the Sun in accordance with Kepler's Second Law. However, in the case of a planet moving around the Sun in an elliptical path having a positive eccentricity such as Mercury or Mars, the rotational speed of the planet being simulated will not be constant since the distance varies between the planet's center and the Sun's center. The following description illustrates a unique mechanism which produces a non-uniform angular velocity output driven by a uniform angular velocity input which output corresponds to Kepler's Second Law.

Figures 13, 16:
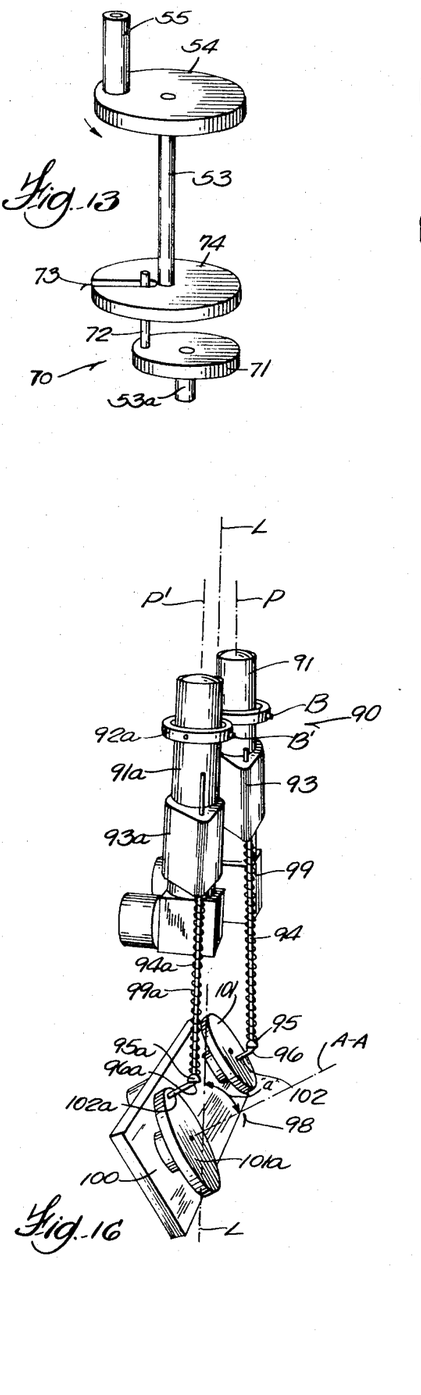
FIG. 13 is a perspective view of the novel drive train provided by the invention.
FIG. 16 is a perspective view of two cooperatively associated projectors for producing image projection of an eclipsing binary star.

Referring to FIG. 13, a drive mechanism 70 is shown which is substituted for mechanism 52 illustrated in FIG. 2 for driving the arrangement shown in FIG. 10. As noted earlier, gimbal ring 40a illustrated in FIG. 10 developes an eccentric eliptical path of the image projected onto a screen. Drive mechanism 70 is similar to mechanism 52 in that it includes a drive shaft 53 and drive wheel 54 having an axially projecting tube 55 for receiving and driving the ball 56 of the particular projector 20 being driven. The rotation of shaft 53, however, varies in accordance with Kepler's Second Law as a result of the unique relationships of drive mechanism 70. An input shaft 53a and input drive wheel 71 are driven by a gear train 24 at a constant rotational speed. A pin 72 is anchored in wheel 71 and projects to the opposite side of shaft 53a in an axial direction offset from the axis of shaft 53a. The pin 72 is captured in a radial slot 73 formed in an output wheel 74 anchored to the opposite end of shaft 53 from wheel 54. Shafts 53 and 53a are offset axially from each other such that as shaft 53a is rotated, pin 72 drives output wheel 74 which therefore drives wheel 54 and tube 55. However, since the shafts 53 and 53a are not in alignment, the radial position of pin 72 within slot 73 will vary as the wheel is driven through a 360° rotation. As the pin location changes in the slot, the speed of wheels 74 and 54 will vary uniformly relative to input shaft 53a. In other words, as the wheels turn, the distance of pin 72 to the axis of wheel 74 changes, being smallest in the position shown in FIG. 13 and greatest 180° from that position. Thus, as wheel 71 rotates with uniform angular velocity through a full 360°, wheel 74 slows down gradually for 180° and then speeds up again during the second 180° revolution. The resultant rotation of wheel 74 and wheel 54 which drives the projector accomplishes a rotational output corresponding to Kepler's Second Law.

If the drive mechanism 70 is utilized to drive the projector illustrated in FIG. 10, there is a slight error in rotational speed built in by the separation of axes A and B of gimbal ring 40a. To illustrate this, assume for the moment that gimbal ring 40a shown in FIG. 10 is driven by drive mechanism 52 illustrated in FIG. 2 wherein wheel 54 and tube 55 are rotating with constant speed. Because of the separation of the two axes A and B in gimbal ring 40a, an elliptical path will result. However, the instantaneous linear velocity of the projected image will vary becoming greatest at the point of least curvature (the point equal distance from the two focal points of the ellipse) and least at the two points in line with the foci. Thus, a compensating mechanism is required which counteracts the non-constant rotation introduced by the gimbal ring 40a when it is combined with a drive mechanism 70 which affects the rotational output in accordance with Kepler's Second Law.

Figure 14:
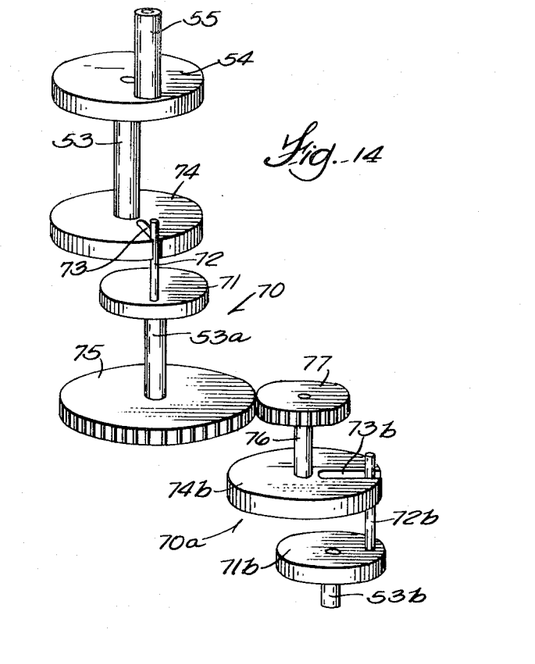
FIG. 14 is a perspective view of an alternative drive train to that shown in FIG. 13.

Referring to FIG. 14, the drive mechanism 70 illustrated in FIG. 6 is shown with the addition of gear 75 connected to the lower end of shaft 53a which gear forms part of the gear train 24. In order to correct the discrepancy provided in the rotational velocity of the image projected through the use of gimbal ring 40a, it is necessary to provide non-uniform rotation of input shaft 53a and input wheel 71. Since the discrepancy caused by gimbal ring 40a is uniform, a uniform non-rotational input is provided by connecting to gear 75 a second mechanism 70a identical in principle to mechanism 70. Thus, an input shaft 53b having an input wheel 71b with a protruding pin 72b cooperates to drive an output wheel 74b having a radial slot 73b in which pin 72b is captured. The resultant non-uniform rotation of wheel 74b is effective through shaft 76 and gear 77 mated with gear 75 to drive gear mechanism 70 at a non-uniform rate. By proper selection of the parameters (i.e., the displacement between parallel shafts 53b and 76) the rotational variance developed by gimbal ring 40a can be offset by drive mechanism 70a which actuates and drives mechanism 70.

To properly adjust mechanisms 70 and 70a shown in FIG. 14, the axis of shaft 53 is first set in line with the axis of shaft 53a of mechanism 70 so that shaft 53 will rotate with uniform angular velocity as long as shaft 53a rotates with uniform angular velocity. From the previous discussion it is clear that uniform angular velocity of shaft 53 results in a variable linear velocity of the projected image due to the gimbal ring axes A and B being non-intersecting. Since this speed variation has two cycles for each rotation of shaft 53, it is necessary to speed up and slow down shaft 53 twice during each revolution.

This is accomplished with a second mechanism 70a similar to mechanism 70 whereby input shaft 53b is then driven with uniform angular velocity and shaft 76 then possesses non-uniform angular velocity as previously described. This non-uniformity of motion of cyclic once each revolution. Preferably the gear ratio between gears 75 and 77 is 2 to 1 so that gear 77 drives gear 75 at one half its speed. This will result in a non-uniform angular velocity of shaft 53a occuring twice each revolution. Since the degree of non-uniformity of motion can be adjusted by adjusting: (1) the distance between the axes of shafts 53b and 76; and (2) the distance from the axis of the shaft 53b and the center of pin 72b; a situation may be reached where the projected image possesses uniform linear velocity along its elliptical path. Once this situation is realized, the axes of shafts 53 and 53a are offset so that the projected image of the projector obeys Kepler's Second Law.

In accordance with the foregoing, an individual projector and drive mechanism is mounted within housing 19 (FIG. 1) representative of each of the selected planets. Projector 20a shown in FIG. 1 represents the Sun projector and hence is stationary since it forms the center of revolution. To recapitulate briefly, the image projectors representative of Saturn, Jupiter, Earth and Venus are comprised of a projector 20 and gimbal ring 40 as shown in FIG. 2 driven by a drive mechanism 52 modified in accordance with mechanism 52a illustrated in FIG. 5. In these cases, a circular rotation is simulated with constant angular velocity. In the case of Mercury and Mars, a projector 20 is mounted within a gimbal ring 40a as illustrated in FIG. 10 to elicit elliptical movement of the image projected on a screen. In this case, a drive mechanism 70 is utilized to provide non-uniform angular linear velocity in accordance with Kepler's Second Law which drive mechanism 70 is driven by a second and similar mechanism 70a as shown in FIG. 10 in order to overcome the discrepancies produced by the use of gimbal ring 40a. The resultant simulated movement of the image on the screen traverses an elliptical path around the stationary Sun which path has an angular velocity corresponding to Kepler's Second Law.

Figure 15:
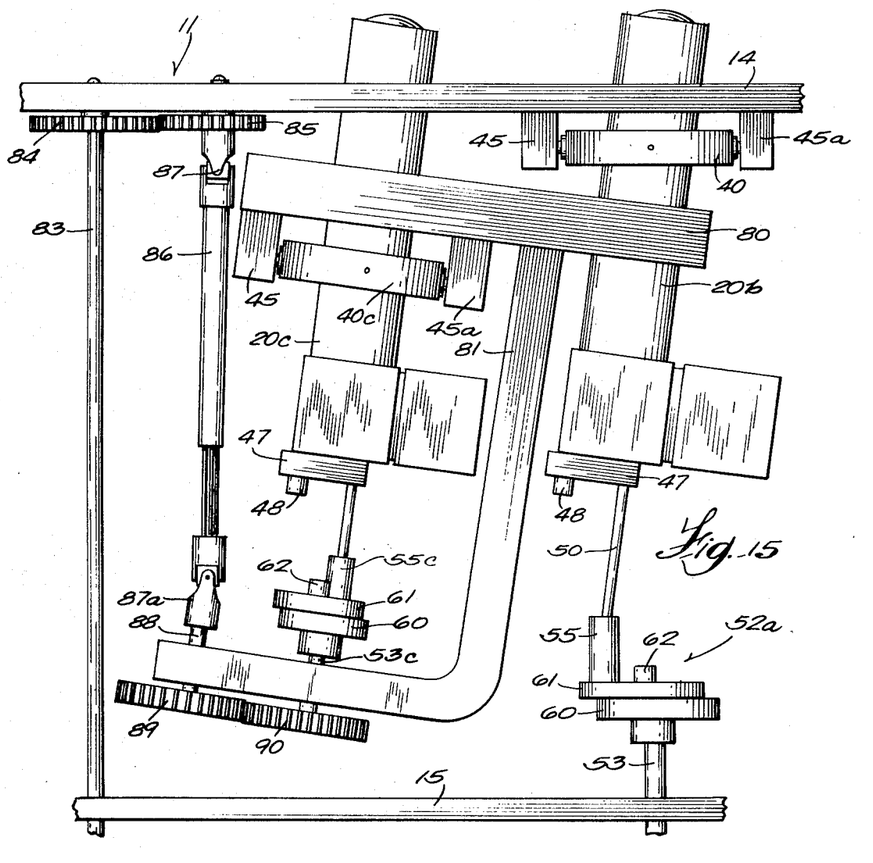
FIG. 15 is a fragmentary elevation view of two cooperatively associated projectors for projecting the image of one celestial body orbiting around the image of a second orbiting celestial body.

Referring now to FIG. 15, an apparatus is illustrated for producing an image of the Moon orbiting around the image of the Earth in the standard orrery of the invention. The earth's projector 20b is shown suspended from plate 14 by supports 45 and 45a utilizing a gimbal ring 40 and drive mechanism 52a mounted to plate 15. Drive mechanism 52a is identical to that illustrated in FIG. 10 and includes an input shaft 53, adjustable input wheels 60 and 61 from which tube 55 projects for cooperation with ball 56 (not shown) suspended on the end of pin 50. In the case of a mechanism such as the Earth's projector producing a circular orbit around the Sun, the Sun projector is anchored to the frame 11 with projector 20b and associated drive mechanism 52a movably mounted relative to frame 11. Thus, tube 55 (FIG. 8) rotates in a circular path whose position is fixed relative to frame 11 resulting in a circular orbit which is fixed relative to the Sun's image.

Applying the same principle to the Moon's orbit around the Earth, it is evident that the associated drive tube 55c which drives the bottom of the Moon projector 20c must describe a circular path which is fixed relative to the Earth's projector 20b.

A mounting block 80 is rigidly connected to the Earth's projector 20b and supports the gimbal ring 40c from whence the Moon's projector 20c is suspended. A pair of supports 45 and 45a identical to those which support the Earth's projector from plate 14 are utilized to connect the Moon's projector to block 80. A subframe 81 is anchored to block 80 and extends downwardly therefrom. The drive shaft 53c for the Moon projector rotates in appropriate bearings mounted in subframe 81. Motion is transmitted to shaft 53c by a power train 82 comprising a shaft 83 extending up from the gear train 24 mounted between plates 15 and 16. Shaft 83 drives a gear 84 in mesh engagement with a gear 85 which drives a spline shaft 86 through a pair of universal joints 87 and 87a mounted at each end of the spline shaft. A shaft 88 is driven by universal joint 87a and rotates in a bearing mounted in subframe 81. Shaft 88 drives a gear 89 in mesh engagement with a gear 90, the latter being connected to the Moon's drive shaft 53c. The Moon's drive shaft 53c is incorporated into the drive mechanism 52a identical to that illustrated in FIG. 5 and utilized for driving the Earth as well as the other related planets which orbit concentrically about the Sun in a circular path. The utilization of universal joints 87 and 87a accommodate any misalignment between subframe 81 and frame 11 of the orrery shown in FIG. 15 by plates 14 and 15.

The resultant image projection provided by the apparatus illustrated in FIG. 15 is the projection of a circular orbiting image representing the Earth by its projector 20b anchored to frame 11 as described previously for rotation about the stationary projection of the Sun. Utilizing a mounting block 80 and subframe 81, an identical projection mechanism is mounted to the subframe and mounting block which is rigidly attached to the Earth's projector 20b such that relative the Moon's projector 20c, the Earth's projector is stationary. The gear train mechanism for driving the Moon projector 20c is modified in order to accommodate any misalignment of frames. Both projection systems illustrated are initially aligned as described previously by the manipulation of drive mechanisms 52a and adjustment blocks 47 through the positioning of screws 48 and the elongated slot 51 shown in FIG. 4.

OPERATION

Having described the various related mechanisms, the operation of the standard orrery provided by the invention should be obvious. The projector mechanisms and related drive mechanisms of the Earth, Saturn, Jupiter, and Venus are identical to that illustrated in FIG. 5 with their direction being aligned in relation to the image projected by the stationary projector of the Sun shown as projector 20a in FIG. 1. The projectors corresponding to the planets of Mercury and Mars are suspended from plate 14 and a modified gimbal ring 40a as shown in FIG. 10 and are driven by a pair of cooperative drive mechanisms 70 and 70a as illustrated in FIG. 14. These images move elliptically around the stationary Sun and the angular linear velocity of the image varies in accordance with Kepler's Second Law upon the proper adjustment of the drive mechanisms. The image of the Earth and its Moon is provided by the arrangement illustrated in FIG. 15 wherein the Moon's projector 20c is physically coupled to the Earth's projector 20b which is in turn coupled to frame 11. Hence, the Earth's image is projected on a screen about the stationary Sun while the Moon's image is projected about the Earth which appears stationary relative the Moon.

The resultant projection of images is extremely realistic and illustrates from a view in the solar system above the Sun perpendicular to the Earth's ecliptic plane an extremely educational and stimulating representation of planetary movement about the Sun.

BINARY STAR PROJECTOR

Binary stars are known as close pairs of stars which orbit in a defined relationship with each other. There are about 20,000 close pairs known and cataloged, and nearly all of them are physical pairs. Only about 2,000, however, have been observed often or long enough to show evidence of mutual orbital motion. Of the 2,000 only about 250 pairs have completed enough of a revolution so that their orbital characteristics are known. There are about 3,000 binary stars that vary in light for a fraction of the time. Usually they are of constant apparent magnitude but periodically they dim for awhile. The variance in apparent magnitude of light is generally caused by a partial or total eclipsing of the stars. Generally the pairs of stars are of different size so that when the larger star is in front of the smaller, a total eclipse is achieved whereas if the smaller is in front of the larger, an annular eclipse is achieved. Regardless of the type of binary star, the ability of project an image of binaries on a screen provides an educational capability in teaching or studying binaries.

In the case of eclipsing binaries, the two stars orbit around their common center of gravity which is close to the center of the larger star. It is desired therefore in accordance with the invention to project images which both move, although the larger star would move less. Generally, the orbital motion of the larger star will be smaller than its own diameter. The image of the smaller star should be bright enough so that the color of the larger one will not "show through" the image of the smaller one when it is crossed by the smaller. On the other hand, the image of the smaller should be eclipsed by the larger when it passes behind it.

Referring now to FIG. 16, a binary star projector mechanism 90 is illustrated which utilizes a pair of image projectors 91 and 91a, projector 91 representing the image of the larger star and projector 91a representing the image projector for the smaller star orbiting about the larger star.

Each of the projectors are connected to the projector frame (not shown) by a gimbal ring, 92, 92a similar to the gimbal ring 40 described with reference to FIGS. 2 and 3. The gimbal axes of each gimbal ring intersect to permit circular orbital projection. The axis A of each gimbal ring is common to both as shown while the axes B and B' are parallel to each other. A block 93 and 93a is anchored respectively to each projector and is provided with a relatively long bearing (not shown) situated parallel to the projection axes P and P' of the projectors. A rod 94, 94a is mounted in the respective bearings and free to slide axially therein. The lower end of each rod is provided with a concave spherical seat 95, 95a which is in intimate contact with a ball 96, 96a which drives the projectors and is part of the drive mechanism 98 to be described. A coil spring 99, 99a encloses rods 94, 94a and is compressed between blocks 93, 93a and seats 95, 95a to constantly urge seats 95, 95a into intimate contact with balls 96, 96a. Thus, regardless of the position of balls 96, 96a as will be described hereinafter, rods 94, 94a are continuously biased into contact with the balls in reaction to the movement of the balls.

Drive mechanism 98 includes a support table 100 on which is mounted a pair of gear driven wheels 101 and 101a which are geared together to rotate in the same direction at the same speed. A pin 102, 102a is embedded respectively in each wheel and projects axially therefrom. Balls 96, 96a are mounted at their outer end for engagement with the concave seats 95, 95a. As wheels 101, 101a rotate circularly, balls 96, 96a describe a circular path and may be thought of as a star analog as their paths represent the orbits of the binary stars simulated by the image projected from projectors 93, 93a. The radial distance of each pin 102, 102a from the respective axis of each wheel defines the magnitude of orbit of the respective projector attached through rods 94, 94a. Thus, pin 102 is positioned near the axis of wheel 101 and describes the small orbit of the large star. Pin 102a is positioned farther away from the axis of wheel 101a and describes a larger orbit of the small star projected by projector 101a. Preferably, the axes of rotation of wheels 101, 101a are parallel.

The aspect or apparent point of view is defined by the positions of balls 96, 96a. If the spherical balls are considered to be a star analog, then the apparent point of view of the binary star images projected would be from a point where the axes of the gimbal ring cross. If wheels 101, 101a are positioned so that their axes intersected both axes of the respective gimbal rings 91, 91a then the orbits would be circular. But if the aspect axis AA of wheels 101, 101a are tilted at some angle "a" to a line L which includes the intersection of the axes A of the gimbal rings and the centers of the circular paths of the balls 96, 96a then the apparent point of view is not perpendicular to the star's orbital plane. Rather it is at an angle to the orbital plane of the stars. If the angle between the axes of the wheel on a line including the intersection of both axes of the gimbal rings and the center of the balls' circular path is 90°, then the apparent point of view would be in the plane of the star's orbit. From this discussion it is apparent that any plane of view of the star's orbit may be selected by selecting an appropriate angle between the line connecting the intersection of the two axes of the gimbal rings 92, 92a and the axes of the wheels 101, 101a. Rods 94, 94a may thus be thought of as representing the line of sight to the stars. This selection is accomplished physically in the preferred embodiment by simply selecting the angle of inclination of table 100 assuming that the projectors are vertically oriented.

It should be noted that there is a slight error introduced by the fact that rods 94, 94a, may not pass directly through the intersection of the axes of the gimbal rings 91, 91a. This slight error is of little practical consequence however since the screen onto which the images are projected is generally quite far from the projector mechanism itself.

The foregoing apparatus provides a means for simulating the movement of binary stars whether or not they are eclipsing. Additionally, by selecting the inclination angle "a" of the table 100, the aspect or apparent point of view relative the orbital plane of the stars can also be selected. The following description pertains to a method and means for specifically simulating the movement of a binary star pair which eclipses.

ECLIPSING BINARY STAR PROJECTION

Figure 17:
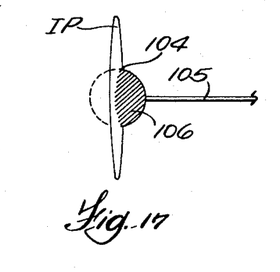
FIG. 17 is a fragmentary elevation view in cross-section of an eclipsing device in accordance with the invention.

FIG. 17 depicts the movement of the transparent image 104 as the small star projector 91 moves, the image 104 moving elliptically as shown. Fastened to the large star projector 91 is a bracket 105 holding an opaque image 106 of one-half the larger star image (not shown). This opaque image 106 follows the elliptical path of the large star image as the projector is driven by drive mechanism 98. The opaque image 106 is however, superimposed just above the path of the smaller star image 104. Therefore, as the small star image 104 passes along the left side of its elliptical path as illustrated in FIG. 17, it passes beside the opaque larger star half image 106 and it is not eclipsed. The small star image 104 which should be projected brighter will apparently pass in front of the projected image of the larger star. As the small star image 104 follows along the right side of its elliptical path, it will pass under the opaque image 106 of the larger star and will be eclipsed. Therefore, the projected images will show the small star passing behind the large star. It is necessary to provide a means for adjusting the opaque image of the larger star so that it is lined up on the screen exactly with the projected image of the large star. This may be achieved simply be bending the bracket 105 which may be made of wire, or a more elaborate system using screw adjustments. Such a means is expedient in this art, and therefore not described in detail.

It should be noted that the alignment of the orbits in the binary star projector can be accomplished by setting the position of gimbal rings 91, 91a on the projector frame (not shown). Alignment in accordance with the teaching concerning the standard orrery as described previously with reference to FIGS. 4–9 are unsuitable because of the arrangement of blocks 93, 93a.

VARIABLE ASPECT ORRERY

With the standard orrery previously described, it is possible to view the planets as if the observer were in space above the Earth's ecliptic plane on a line passing through the Sun perpendicular the Earth's ecliptic plane. This view is represented by the arrow "A" shown in FIG. 18 which illustrates in perspective, the Earth's ecliptic plane EP.

A variable aspect orrery is one which would provide a means of observing the defined solar system from any point in space along a line equal distance from the Sun and running from a point above the Sun, perpendicular to the ecliptic down to a point which lies in the ecliptic. This latter point is designated by arrow "E" in FIG. 18. The intermediate arrows "B," "C" and "D" illustrate selected intermediate points of view.

Figure 19:
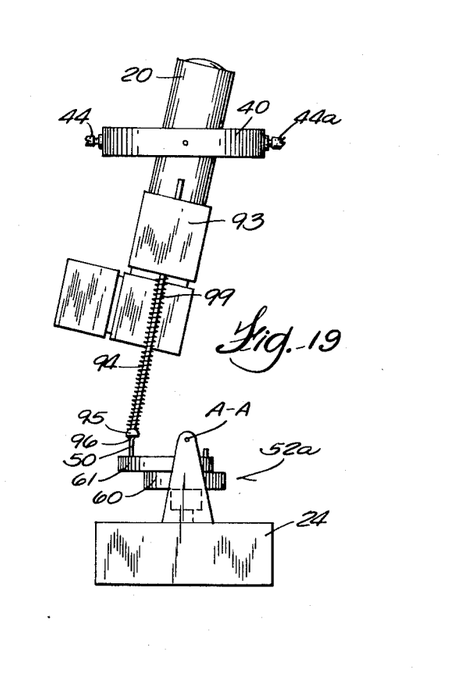
FIG. 19 is a fragmentary side elevation view of a single projector and drive means for varying the aspect in accordance with the invention.

Referring now to FIG. 19, a typical planet projector 20 is shown utilizing a gimbal ring 40 driven by a drive mechanism 52a as described previously with respect to FIGS. 2, 3 and 5. In the standard orrery previously described, each planet projector is supported in a gimbal ring which in turn is supported by frame 11. Wheels 60 and 61 were driven by a shaft from the gear train 24 fixed to frame 11 for driving the bottom of projector 20 around in a circle. Since the gear train 24 and drive mechanism 52a for each projector was stationary with frame 11, the aspect or line of sight was fixed.

The variable aspect projector is basically different from the standard orrery projector in that the gear train and related drive mechanisms are free to be positioned around what will be referred to as the aspect axis AA illustrated in FIG. 18.

Figure 20:
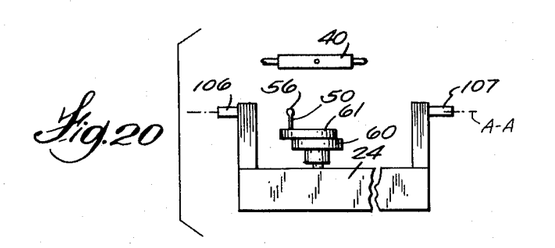
FIGS. 20-24 are fragmentary elevation views of the drive means utilized in varying the aspect of an orrery projector corresponding to the reference views illustrated in FIG. 18.
Figures 21, 22:
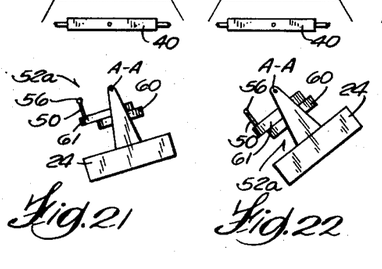
Figure 23:
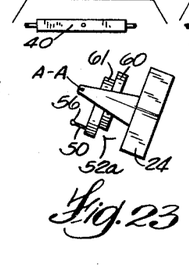
Figure 24:
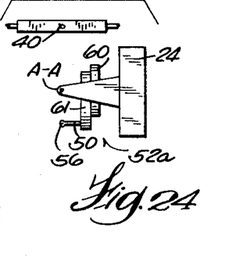

Referring to FIG. 19, the gear train 24 which actuates drive mechanism 52a is suspended by a pair of pins 106 and 107 (FIG. 20) which rotate and permit the gear train 24 to rotate about the aspect axis AA. Pins 106 and 107 are mounted appropriately in bearings to the orrery frame (not shown). Projector 20 and gear mechanism 52a are modified slightly to correspond to the interconnection illustrated with regard to the binary star projector illustrated in FIG. 16. In other words a block 93 having a bearing therein is fixed to the bottom portion of projector 20 and receives a rod 94 slidable axially in the bearings of block 93. The bottom end of rod 94 includes a concave seat 95 urged by spring 99 into intimate contact with a ball 96 formed at the upper end of pin 102 projecting from drive wheel 61.

With ball 95 of the drive mechanism 52a illustrated in FIG. 19 corresponding to the orbital analog of the planet's image being projected, it will be appreciated that the aspect from which the simulated images viewed can be varied in accordance with the operation of the binary star projector 90 illustrated in FIG. 16. Thus, by rotating gear train 24 about the aspect axis AA (FIGS. 19–24), the apparent position of the observer can be selected thereby modifying the appearance of the orbital movement of each planet. FIGS. 20–24 illustrate the relative positions between the orientation of gear train 24 and drive mechanism 52a with respect to gimbal ring 40 of the projector illustrated in FIG. 19.

If the variable aspect orrery includes the six planets, Sun and Moon of the standard orrery described in the preferred embodiment of this invention, a series of projectors and drive mechanisms may be mounted on a common table similar to table 100 illustrated in FIG. 16. The arrangement most likely will be in two rows of three projectors with two positionable gear trains 24 similar to that illustrated in FIGS. 19–24. Each gear train will serve three planet projectors with the three projectors being in a line and the two gear trains synchronized by a suitable linkage. The aspect can then be varied by rotating or tilting each table simultaneously. It will be appreciated that the elliptical orbits of Mercury and Mars which are driven by a separate drive mechanism 70 and 70a described previously as well as the modified gimbal ring 40a can be incorporated into the variable mechanism.

When the aspect is viewed from the Earth's ecliptic plane, the planets will orbit out of view since the Sun will eclipse their sight when they are on the opposite side of the Sun relative to the apparent line or aspect viewpoint. An eclipsing device similar to that described with reference to FIG. 17 can be attached to frame 11 to accomplish a similar result; i.e., total eclipsing of each planet as it revolves about the Sun.

Although several embodiments have been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. Apparatus for projecting a moving image onto a screen comprising, in combination: a support frame; a subframe suspended from said support frame and pivotable relative thereto about a first axis; an image projector means suspended by said subframe and pivotable about a second axis perpendicular to said first axis, said projector means including a light source for projecting a light beam image onto a screen; and drive means cooperative with said projector means for driving said projector means circumferentially about a third axis perpendicular to said first axis whereby said image projected on said screen describes an ellipse.

2. The apparatus according to claim 1 wherein said image description on said screen is a circle when said first, second and third axes are intersecting.

3. The apparatus according to claim 2 wherein said image description on said screen is an ellipse having an eccentricity greater than zero when said first and second axes are non-intersecting and said third axis intersects said first and second axes.

4. The apparatus according to claim 1 wherein said subframe is a ring means, said image projector means is suspended concentrically within said ring means, said projection axis extending perpendicular to said second axis.

5. The apparatus according to claim 1 wherein said projector means includes follower means in cooperative engagement with said drive means; said drive means includes a first mechanism rotatable about a drive axis, said first mechanism including means projecting toward said follower means and spaced radially from said drive axis and cooperable with said follower means so that as said first mechanism rotates, said follower means and projector means are driven circumferentially about said third axis.

6. The apparatus according to claim 5 wherein said first mechanism and drive axis are pivotable about an aspect axis between a first position wherein said drive axis and said third axis are parallel; a second position wherein said drive axis is perpendicular to said third axis; and a third position intermediate said first and second positions.

7. The apparatus according to claim 6 wherein one of said first mechanism and follower means is movable relative to the other and urged into constant engagement with the other, said first mechanism and follower means being pivotal to each other.

8. The apparatus according to claim 5 wherein said follower means is comprised of a stem having a spherical ball at its free end, said means projecting toward said follower means comprising a tubular element, said spherical ball being captured within said tubular element.

9. The apparatus according to claim 8 wherein said stem is anchored to a block means, said block means being adjustably anchored to the lower end of said projector means whereby the position of said stem and ball relative to the axis of projection of said light beam can be preselected to set the aim of said projector means.

10. The apparatus according to claim 5 wherein said drive means includes a sub-drive mechanism rotatable about said drive axis, said first drive mechanism being detachably anchored to said sub-drive mechanism at various positions of rotation relative to said sub-drive mechanism whereby the radial displacement of said means projecting toward said follower means from said drive axis can be preselected to determine the magnitude of circumferential rotation of said projector means about said third axis.

11. The apparatus according to claim 5 wherein said drive means includes a second drive mechanism rotatable about a second drive axis and including means projecting generally axially toward said first drive mechanism and spaced from said second drive axis, said first drive mechanism including means defining a radially extending shoulder for sliding engagement with said means projecting from said second drive mechanism whereby constant speed rotation of said second drive mechanism causes variable speed rotation of said first drive mechanism in general accordance with Kepler's Second Law.

12. The apparatus according to claim 11 wherein said first drive mechanism includes a pair of axially spaced discs mounted to a drive shaft for joint rotation therewith, one of said discs including said means projecting toward said follower means, the other of said discs including said radial shoulder, said radial shoulder comprising an elongated slot extending radially from said drive shaft, said second drive mechanism including a drive disc mounted on a second drive shaft extending parallel to said first drive shaft and spaced therefrom, said means projecting generally axially toward said first drive mechanism comprising a pin extending from said drive disc and captured within said slot.

13. The apparatus according to claim 1 wherein the axis of projection of said light beam image is perpendicular to said second axis.

14. A planetarium arrangement comprising, in combination: a support frame; a plurality of image projector means suspended from said support frame, each of said projector means being pivotal about a first and second axis perpendicular to each other and including a light source for projecting a light beam image onto a screen; and drive means cooperative with one or more of said projector means for driving movement circumferentially about a third axis perpendicular to said first axis whereby the moving images projected on said screen describe an ellipse.

15. The planetarium arrangement according to claim 14 wherein said first, second and third axes of one or more of said image projector means are intersecting, and the related image description on said screen is a circle.

16. The planetarium arrangement according to claim 14 wherein said first and second axes of one or more of said image projectors are non-intersecting, and the related image description on said screen is an ellipse having an eccentricity greater than zero.

17. The planetarium arrangement according to claim 16 wherein the drive means for said one or more projectors causes movement of said projectors at variable rotational speed in accordance with Kepler's Second Law.

18. The planetarium arrangement according to claim 17 wherein said drive means for said one or more projectors includes a first drive mechanism rotatable at a constant speed about a first drive axis, and a second drive mechanism rotatable about a second drive axis parallel to and spaced from said first drive axis, one of said first and second drive mechanisms including means projecting toward the other of said drive mechanisms in a generally axial direction, the other of said drive mechanisms including means defining a shoulder extending radially with respect to the axis of said other drive mechanism, said shoulder being in sliding engagement with said means projecting from said one of said drive mechanisms whereby constant speed rotation of said first drive mechanisms results in a variable speed rotation of said second drive mechanism in general accordance with Kepler's Second Law.

19. The planetarium arrangement according to claim 14 wherein each of said drive means includes a first drive mechanism rotatable about a drive axis, said drive mechanism including means projecting toward and cooperatively associated with one of said projector means to drive same, each of said drive means being mounted on said support frame for joint pivotal movement relative to said support frame and each of said projector means about an aspect axis between a first position wherein each of said drive axes and third axes of each of said projector means are parallel; a second position wherein said drive axes are perpendicular to said third axes; and a third position intermediate said first and second position.

20. The planetarium arrangement according to claim 19 wherein said arrangement is a variable aspect projection orrery, one of said projector means being rigidly affixed to said support frame, the image projected thereby representing the Sun; the image of a second projector means representing the image of the Earth; a third projector means being interconnected to said second projector means and pivotal relative thereto by a pair of perpendicularly intersecting axes and having a drive means for rotating said third projector means circumferentially about said third axis of said third projector means whereby the image of said third projector means represents the image of the Earth's Moon revolving around the Sun in the Earth's solar system; said drive means being rotatable about an aspect axis relative to said support frame and said projector means whereby the aspect angle from which the celestial description is viewed is movable from a first position wherein the celestial movement is viewed along a line through the center of the Sun perpendicular to the Earth's ecliptic plane to a second position through the Sun's center on the Earth's ecliptic plane.

21. A rotary drive for rotating an image projector having a light source for projecting a light beam image onto a screen comprising, in combination: a first mechanism fixed to a drive shaft and rotatable therewith; a second drive mechanism affixed to a second drive shaft and rotatable therewith, said second drive shaft spaced from and parallel to said first drive shaft, said first mechanism including means projecting generally axially toward said second mechanism and spaced radially from said first drive shaft, said second mechanism including means defining a radially extending shoulder for sliding engagement with said means projecting from said first mechanism whereby constant speed rotation of one of said drive shafts causes uniform variable speed rotation of the other of said drive shafts in general accordance with Kepler's Second Law, one of said first and second mechanisms including means projecting toward and engageable with said image projector to drive same rotatably about a drive axis in accordance with Kepler's Second Law.

22. The apparatus according to claim 21 wherein said first drive shaft is rotated at a constant speed and said second mechanism includes said means projecting towards said image projector.

23. The apparatus according to claim 22 wherein said first and second mechanisms are each comprised of a disc affixed respectively to said drive shafts, said means projecting from said first disc comprising a stem, said means defining a shoulder comprising an elongated slot extending radially in said second disc, the free end of said stem being captured in said slot to drive said second disc.

24. The apparatus according to claim 21 wherein said means projecting toward and engageable with said image projector comprises a means adapted to capture a follower means extending from said image projector for driving said image projector circumferentially about a drive axis whereby said image on said screen describes an ellipse.

25. The apparatus according to claim 21 wherein said first and second mechanisms and drive shafts are pivotable jointly relative to said drive axis about an aspect axis whereby the apparent position of the observer of said moving image on said screen is selected by modifying the appearance of the movement of said image.

26. The apparatus according to claim 25 wherein said first and second mechanisms and drive shafts are pivotable about said aspect axis between a first position wherein the axes of said drive shafts are parallel to said drive axis and a second position wherein the axes of said drive shafts are perpendicular to said drive axis.

27. A rotary drive for rotating an image projector having a light source for projecting a light beam image onto a screen comprising first means fixed to a drive shaft and rotatable therewith and including second means projecting toward said image projector, said second means being spaced from said drive shaft and extending generally parallel therewith, said second means adapted to capture a follower means extending from said image projector for driving said image projector circumferentially about a drive axis.

28. The rotary drive according to claim 27 wherein said first and second means and said drive shaft are pivotable jointly relative to said drive axis about an aspect axis whereby the appearance of movement of said image on said screen is modified so that the apparent position of the observer is changed.

29. The rotary drive according to claim 28 wherein said first and second means and said drive shaft are pivotable about said aspect axis between a first position wherein the axis of said drive shaft is parallel to said drive axis and a second position wherein the axis of said drive shaft is perpendicular to said drive axis.

30. The rotary drive according to claim 28 wherein one of said second means and follower means is movable relative to one of said image projector and first means and urged into constant engagement with the other of said second means and follower means, said second means and follower means being pivotable relative to each other.

31. The rotary drive according to claim 30 wherein said second means is characterized by a stem having a spherical ball at its free end, and said follower means extending from said image projector includes means defining a second stem movable generally axially relative to said drive axis, the free end of said second stem including a cup means engageable with said spherical ball of said first stem, said second stem and cup means being biased into constant engagement with said spherical ball to define a universal joint.

32. In a planetarium arrangement having a support frame; one or more image projector means mounted on said frame and movable relative thereto; drive means cooperative with one or more of said projector means to cause the light beam image from said projector means to move on a projection screen in an orbital fashion; the improvement comprising: said drive means being pivotable about an aspect axis whereby the orbital movement of each light beam image on said screen is modified so that the apparent position of an observer of said screen is changed.

33. The improvement according to claim 32 wherein said projector means includes a follower means cooperatively engaged with said drive means, said follower means being movable relative to said projector means and urged into constant engagement with said drive means regardless of the position of said drive means relative to said aspect axis.

34. The improvement according to claim 33 wherein said drive means includes a stem extending toward said projector means and movable about an axis parallel to the longitudinal axis of said stem, said stem having a spherical ball at its free end, said follower means extending from said image projector including means defining a second stem having a cup means at its free end engageable with said spherical ball to define a universal joint.

* * * * *